US007182148B1

(12) United States Patent
Szieff

(10) Patent No.: US 7,182,148 B1
(45) Date of Patent: Feb. 27, 2007

(54) TOOL WITH MOTION AND ORIENTATION INDICATORS

(76) Inventor: William Szieff, 6509 Nancy, Rancho Palos Verdes, CA (US) 90275

( * ) Notice: Subject to any disclaimer, the term of this patent is extended or adjusted under 35 U.S.C. 154(b) by 10 days.

(21) Appl. No.: 11/200,361

(22) Filed: Aug. 9, 2005

Related U.S. Application Data

(63) Continuation-in-part of application No. 10/916,163, filed on Aug. 11, 2004.

(51) Int. Cl.
*B23B 45/14* (2006.01)

(52) U.S. Cl. ........................ 173/20; 173/217; 173/171; 33/333; 33/366.14; 33/370; 408/16; 340/825.23

(58) Field of Classification Search .................... 173/2, 173/1, 20, 171, 217; 408/6, 13, 16; 409/210, 409/208, 218; 340/680, 825.23; 33/333, 33/334, 370, 355 R, 366.14
See application file for complete search history.

(56) References Cited

U.S. PATENT DOCUMENTS

| | | | | | |
|---|---|---|---|---|---|
| 3,052,036 | A | * | 9/1962 | Oliver | 33/334 |
| 3,242,773 | A | * | 3/1966 | Praag | 408/16 |
| 3,664,754 | A | | 5/1972 | D. Kelbel | |
| 4,281,949 | A | | 8/1981 | Bugarin | |
| 4,319,403 | A | * | 3/1982 | Stearns | 33/638 |
| 4,329,095 | A | | 5/1982 | Schmuck | |
| 4,393,599 | A | * | 7/1983 | Sterrenberg | 33/336 |
| 4,457,078 | A | | 7/1984 | Suchy | |
| 4,546,549 | A | * | 10/1985 | Duperon | 33/334 |
| 4,564,322 | A | | 1/1986 | Stapley | |
| 4,922,620 | A | * | 5/1990 | Terragni | 33/366.14 |
| 5,027,522 | A | * | 7/1991 | Cagan et al. | 33/366.14 |
| 5,063,679 | A | * | 11/1991 | Schwandt | 33/347 |
| 5,432,503 | A | | 7/1995 | Pekar | |
| 5,887,355 | A | | 3/1999 | Wolff | |
| 2003/0029050 | A1 | | 2/2003 | Fung et al. | |

* cited by examiner

*Primary Examiner*—Scott A. Smith
(74) *Attorney, Agent, or Firm*—Eric Karich

(57) ABSTRACT

A tool has a housing; a display unit attached to the housing; and a motion detection unit operably coupled to the housing and to the display unit, wherein the motion detection unit is configured to detect linear and rotational motion of the housing, to generate a first display signal indicative of the linear motion of the housing and to provide the first display signal to the display unit, and to generate a second display signal indicative of the rotational motion of the housing and to provide the second display signal to the display unit.

17 Claims, 2 Drawing Sheets

TOOL WITH MOTION AND ORIENTATION INDICATORS

CROSS-REFERENCE TO RELATED APPLICATIONS

This application for a utility patent is a continuation-in-part of a previously filed utility patent, still pending, having the application Ser. No. 10/916,163, filed Aug. 11, 2004.

STATEMENT REGARDING FEDERALLY SPONSORED RESEARCH

Not Applicable

BACKGROUND OF THE INVENTION

1. Field of the Invention

This invention relates generally to tools, and more particularly to a tools that includes a movement indicator and a orientation indicator for indicating the position and orientation of the tool with respect to a reference location.

2. Description of Related Art

A hand drill is a common type of portable power tool. When drilling a hole with a hand drill it is often desirable to maintain a particular orientation of a drill bit with respect to a material being drilled. It is often also desirable to know a depth of the drill bit into the material being drilled.

Devices used with hand drills to monitor orientations of drill bits with respect to materials being drilled are commonly referred to as "level indicators." Known types of level indicators include liquid-filled bubble levels. While some bubble levels are mounted to hand drills via rotatable arms, such arms typically rotate in only a single plane and thus cannot be adjusted to monitor drill bit orientations in all possible starting orientations.

Devices used with hand drills to monitor depths of drill bits into materials being drilled are commonly referred to as "depth indicators." Known types of depth indicators used with hand drills include plunger-type mechanisms with graduated rods wherein ends of the rods contact surfaces of materials being drilled. However, when angles formed between drill bits and the surfaces of materials are small, the ends of the rods tend to slide along the surface away from the drills. This sliding makes the depth measurements inaccurate.

It would thus be desirable to have a portable power tool with depth and orientation indicators that are both highly accurate and easy to adjust for all possible starting orientations.

SUMMARY OF THE INVENTION

The present invention teaches certain benefits in construction and use which give rise to the objectives described below.

The present invention provides a tool comprising a housing; a display unit attached to the housing; and a motion detection unit operably coupled to the housing and to the display unit, wherein the motion detection unit is configured to detect linear and rotational motion of the housing, to generate a first display signal indicative of the linear motion of the housing and to provide the first display signal to the display unit, and to generate a second display signal indicative of the rotational motion of the housing and to provide the second display signal to the display unit.

A primary objective of the present invention is to provide a tool having advantages not taught by the prior art.

Another objective is to provide a tool having a motion detection unit configured to detect and indicate linear displacement and rotational motion of the tool.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
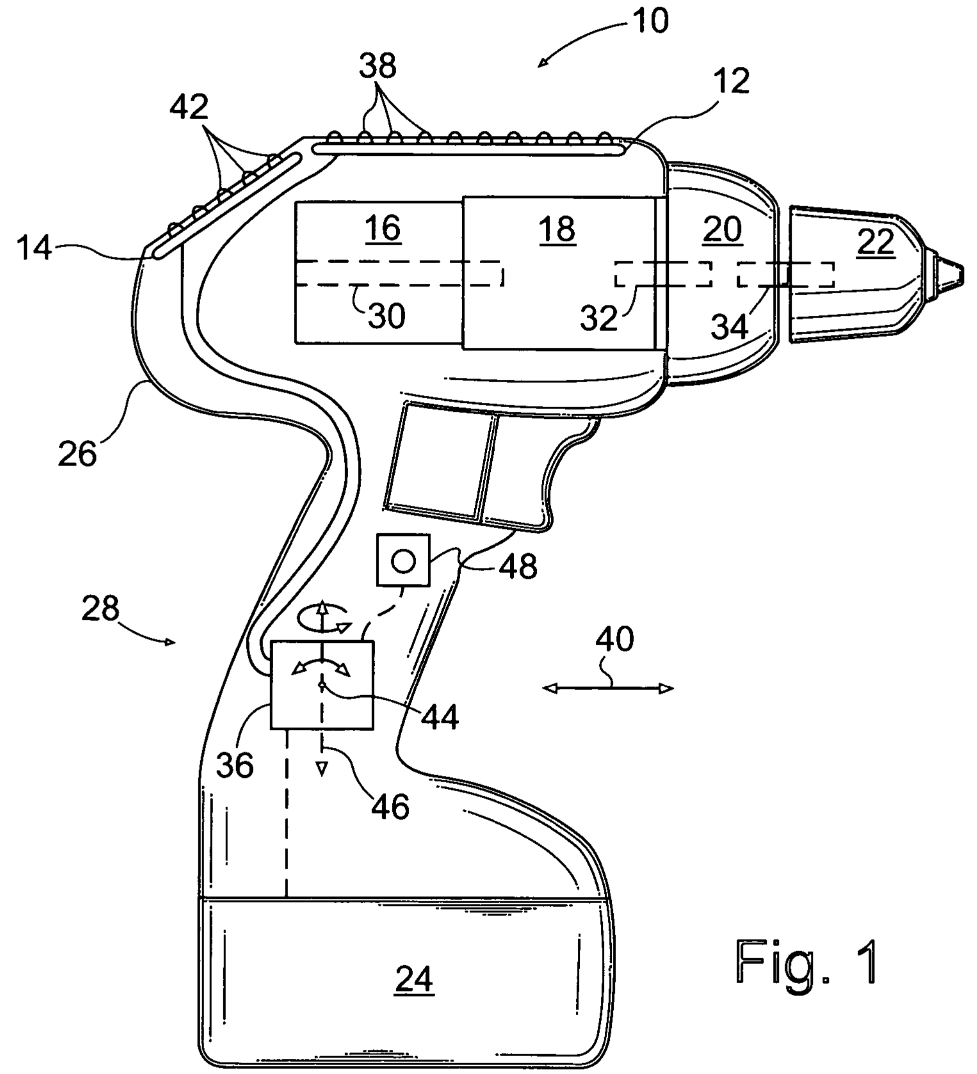
FIG. 1 is a side elevation view of one embodiment of a tool including a display unit coupled to a motion detection unit, wherein the tool is a cordless hand drill.

FIG. 1 is a side elevation view of one embodiment of a tool 10, wherein the tool is a portable power tool, namely a cordless hand drill. The tool 10 includes a motion detection unit 36 operably coupled to a housing 26 and a display unit. In the present embodiment, the display unit includes a first display unit 12 forming a depth indicator and a second display unit 14 forming a orientation indicator.

In the embodiment of FIG. 1 the hand drill 10 includes an electric motor 16 coupled to a chuck 22 via a transmission 18 and a clutch 20. A removable battery 24 provides electrical power for the hand drill 10. The electric motor 16, the transmission 18, and a portion of the clutch 20 are housed in the housing 26, and the removable battery 24 forms a lower extension of the housing 26. The housing 26 includes a handle portion 28 adapted for gripping by a human hand. The chuck 22 is adapted to grip a shaft of an accessory (e.g., a shaft of a rotary tool such as a drill bit).

The electric motor 16 includes a shaft 30 that rotates when electric power is applied to the electric motor 16. In general, when the chuck 22 grips a shaft of an accessory, the shaft of the accessory rotates when the shaft 30 of the electric motor 16 rotates. The shaft 30 of the electric motor 16 is coupled to an input of the transmission 18, and the transmission 18 has an output shaft 32. In general, the transmission 18 is a gear reduction mechanism, and is preferably a planetary gear reduction mechanism. The shaft 32 of the transmission 18 is coupled to an input of the clutch 20, and a shaft 34 is coupled to an output of the clutch 20. As shown in FIG. 1, the chuck 22 is connected to an end of the shaft 34 extending from the clutch 20. In general, the clutch 20 allows the shaft 34 (and the connected chuck 22) to rotate when a user-selected torque level is not exceeded.

While the present embodiment focuses on the above-described cordless hand drill, it should be noted that in other embodiments the tool 10 may be another type of tool, such as, for example, a circular saw, a reciprocating saw, a jig saw, or other form of tool. For convenience the tool 10 will be referred to herein below as "hand drill 10."

The display units 12 and 14 are coupled to a motion detection unit 36 within the housing 26. In general, the motion detection unit 36 is configured to detect motion of the housing 26, to generate display signals dependent upon the detected motion, and to provide the display signals to the display units 12 and 14. As described in more detail below, the display signals are indicative of a change in a linear displacement and/or orientation of the housing 26.

In the embodiment of FIG. 1, the display unit 12 is located on a top portion of the housing 26. The display unit 12 includes multiple light-emitting diodes (LEDs) 38 arranged in a straight line extending between a front portion of the housing 26 (adjacent the clutch 20) and an opposite back portion of the housing 26. Notwithstanding the above, the display unit can be placed at any location on the tool 10, and may even be positioned remotely and separately from the tool 10 itself. The display unit could be one or more LCDs, or in general, could comprise any means of indicating to the user of the tool the translation or orientation of the tool. Alternatively, the display unit could be augmented or replaced by one or more audible signals that inform the user that the drill has accomplished a desired depth, or is out of alignment with a desired orientation.

In general, one or more of the LEDs 38 of the display unit 12 are lighted in response to the display signal from the motion detection unit 36 to indicate displacement of the housing 26 from a reference location established by the user of the tool along a forward/backward direction 40 (i.e., along the line extending between the front and back portions of the housing 26). For example, when the chuck 22 grips a shaft of a drill bit, the LEDs 38 of the display unit 12 are lighted in response to the display signal from the motion detection unit 36 to indicate a depth of the drill bit in a material being drilled.

In general, the LEDs 38 form graduations of a linear scale of motion of the housing 26 along the forward/backward direction 40 (i.e., a linear scale of depth into a material being drilled). That is, when an illuminated one of the LEDs 38 is extinguished and an adjacent one of the LEDs 38 is illuminated, the housing 26 has moved a predetermined distance along the forward/backward direction 40. The predetermined distance may be preset (e.g., 0.25 inches), or may be selectable by a user of the portable power tool 10 (e.g., via a rotary switch).

In the embodiment of FIG. 1, the display unit 14 is located on an angled portion of the housing 26 between the top portion of the housing 26 and the back portion of the housing 26. The display unit 14 includes multiple light-emitting diodes (LEDs) 42 arranged along two perpendicular and intersecting straight lines. One of the lines extends between the front portion of the housing 26 (adjacent the clutch 20) and the opposite back portion of the housing 26, and the other line extends between a right portion of the housing 26 and an opposite left portion of the housing 26.

In general, one or more of the LEDs 42 along the line extending between the front and back portion of the housing 26 are lighted in response to a portion of the display signal from the motion detection unit 36 indicating rotation of the housing 26 away from a reference orientation established by the user about an axis 44 perpendicular to the drill bit and extending from the left side of the drill housing to the right side of the drill housing. The axis 44 passes through the tip of the drill bit.

One or more of the LEDs 42 along the other line, extending between the right and left portions of the housing 26, are lighted in response to a portion of the display signal from the motion detection unit 36 indicating rotation of the housing 26 away from a reference orientation established by the user about an axis 46 perpendicular to the drill bit and extending from the top side of the drill housing to the bottom side of the drill housing. The axis 46 passes through the tip of the drill bit.

As a result, the display unit 14 forms an orientation indicator during use of the hand drill 10. In a preferred embodiment, the user of the drill maintains the drill in close proximity to a reference orientation such that the display signal is generated such that only a single one of the LEDs 42, at the intersection of the two perpendicular and intersecting lines is lighted at any given time.

In general, the LEDs 42 form graduations of linear scales of rotation of the housing 26 about the axes 44 and 46. That is, when an illuminated one of the LEDs 42 is extinguished and an adjacent one of the LEDs 42 is illuminated, the housing 26 has rotated a predetermined amount about the axis 44 or the axis 46. The predetermined amount may be preset (e.g., 2 degrees), or may be selectable by a user of the portable power tool 10 (e.g., via a rotary switch).

The tool 10 further includes a means for establishing a reference location and orientation of the tool 10. The reference location is the point at which the motion detection unit 36 begins tracking movement of the tool 10 and changes in the orientation of the tool 10. In one embodiment, the means for establishing a reference location includes a switch 48. The switch 48 may be a user activated button, switch, or trigger, in this case a pushbutton switch, or it may be a switch that is responsive to an audible command. While these possible forms of switch 48 are discussed in particular, alternative switches may also be used, and should be considered within the scope of the claimed invention.

The switch 48 is operably coupled to the motion detection unit 36. When the switch 48 is activated (i.e., pressed) by a user to indicate that the housing 26 of the hand drill 10 is in a reference starting position. When the pushbutton switch 48 is activated, the motion detection unit 36 generates the display signals to indicate that the housing 26 is in a reference starting position. Following activation of the pushbutton switch 48, the motion detection unit 36 generates the display signals to indicate motion of the housing 26 relative to the reference starting position.

In a preferred embodiment, when the housing 26 is in the reference starting position, only a single one of the LEDs 38 of the display unit 12 nearest the front portion of the housing 26 is lighted, and only a single one of the LEDs 42 of the display unit 14, existing at the intersection of the two perpendicular and intersecting lines, is lighted.

In another embodiment, the pushbutton switch 48 is provided by the trigger of the portable power tool 10. Pressing the trigger 48 indicates that the housing 26 of the hand drill 10 is in a reference starting position, and as the drill is used the display units 12 and 14 operate to indicate movement of the portable power tool 10.

In an alternate embodiment, the tool 10 may be equipped with voice recognition capability such that the user may audibly inform the motion detection unit that the tool 10 is in a reference starting position. In yet another embodiment, the display unit may include one or more level indicators to more readily enable the user to establish a level reference starting location.

Figure 2:
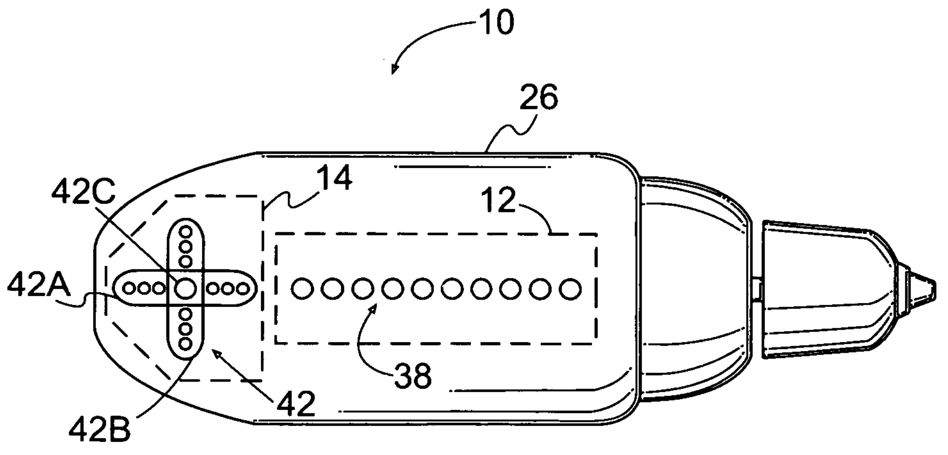
FIG. 2 is a top plan view of the hand drill of FIG. 1.

FIG. 2 is a top plan view of the hand drill 10 of FIG. 1. As described above, the multiple LEDs 38 of the display unit 12 are arranged along in a straight line extending between the front portion of the housing 26 (adjacent the clutch 20) and the opposite back portion of the housing 26.

The LEDs 42 of the display unit 14 include a first portion 42A arranged along the line extending between the front and back portions of the housing 26, and a second portion 42B arranged along the perpendicular and intersecting line extending between the right and left portions of the housing 26. The first portion 42A of the LEDs 42 indicate rotation of the housing 26 about the axis 44 of FIG. 1, and the second portion 42B of the LEDs 42 indicate rotation of the housing 26 about the axis 46 of FIG. 1. One of the LEDs 42, labeled 42C in FIG. 2, exists at an intersection of the two lines and is a member of the portions 42A and 42B. The LED 42C is preferably larger than the other LEDs 42.

As mentioned above, in alternative embodiments the display units 12 and 14 may be positioned in alternative locations of the portable power tool 10, and such alternatives should be considered within the scope of the claimed invention.

Figure 3:
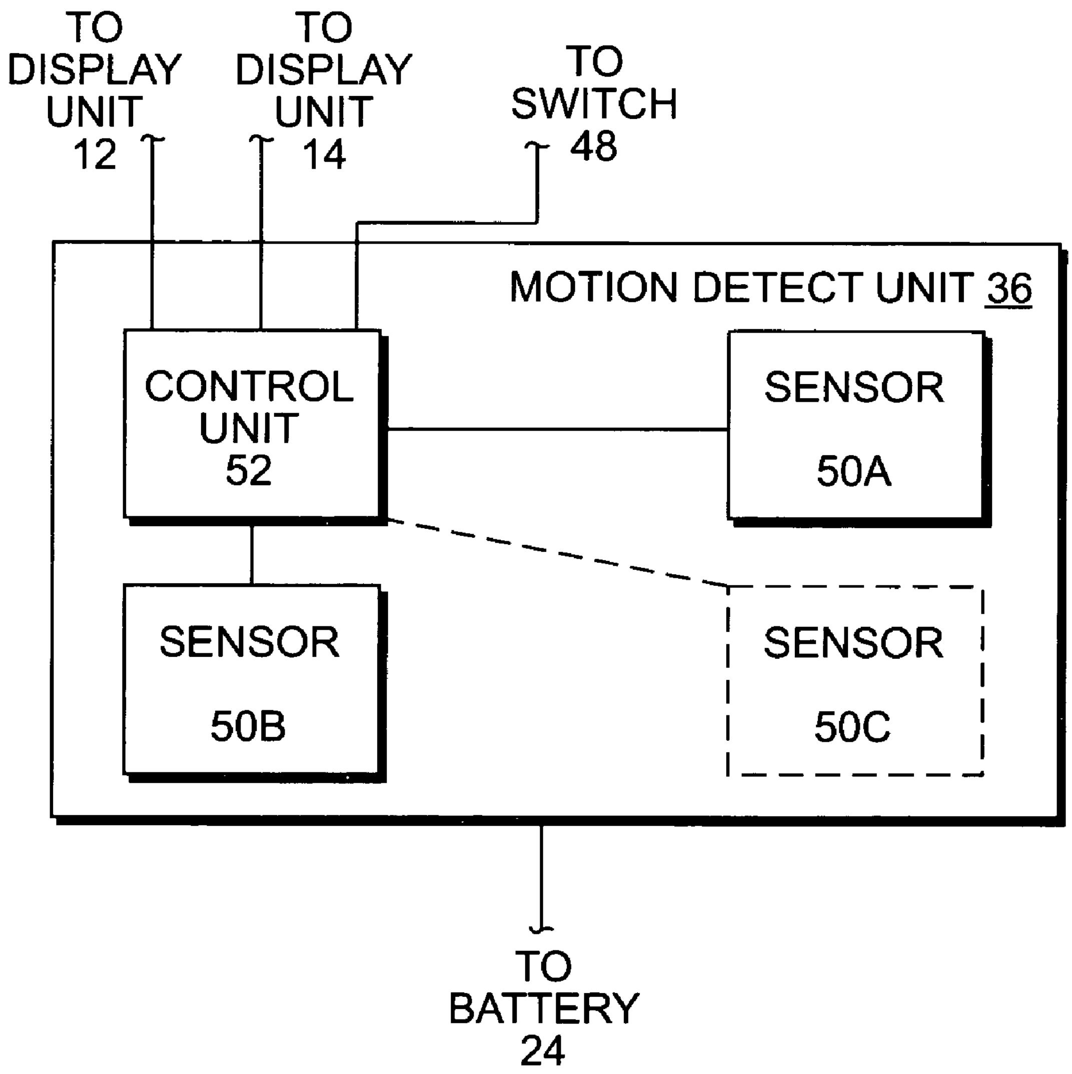
FIG. 3 is a diagram of one embodiment of the motion detection unit of FIG. 1.

FIG. 3 is a diagram of one embodiment of the motion detection unit 36 of FIG. 1. The tool 10 includes a means to detect the displacement and orientation of the tool 10 relative to the reference location, and to generate a signal indicative of the displacement and orientation, and to provide the signal to the display units 12 and 14. In the embodiment of FIG. 1, the means to detect the displacement and orientation of the tool 10 relative to the reference location is the motion detection unit 36, which preferably includes at least two sensors 50A and 50B coupled to a control unit 52. As indicated in FIG. 3, the motion detection unit 36 may include a third sensors 50C, and may include more sensors.

In general, each of the sensors 50 senses motion, generates a signal indicative of the motion, and provides the signal to the control unit 52. The control unit 52 uses the signals from the sensors 50 to detect motion of the housing 26 of FIG. 1. The control unit 52 generates the display signals dependent upon the detected motion, and provides the display signals to the display units 12 and 14.

In general, the sensors 50 may be configured to sense linear displacement and/or rotational motion. The sensors 50 may be, for example, accelerometers and/or gyroscopes. In an alternative embodiment, the sensors may be configured to sense location. The sensors 50 may also be adapted to receive signals from a global positioning network (not shown) and use triangulation to identify the precise location and orientation of the tool 10. In this embodiment, at least one of the sensors must be separate from the hand drill.

The motion detection unit 36 can advantageously be constructed such that the first display unit 12 forms a highly accurate depth indicator and the second display unit 14 forms a highly accurate orientation indicator. The pushbutton switch 48 advantageously makes the depth and orientation indicators easy to adjust (i.e., zero) for all possible reference starting orientations.

In alternative embodiments, the display signal comprises a visual signal, an audible signal, or a numerical value for the displacement of the tool. Furthermore, the user may set a predetermined desired displacement or orientation and the display signal informs the user when such predetermined displacement or orientation is accomplished. In these embodiments, the display unit may be or include a speaker, a vibration generator, or other non-visual mechanism for signaling the user.

While preferred embodiments are illustrated, in alternative embodiments, the housing 26, the display unit (12 and 14), and/or the motion detection unit 36 may be associated with the tool 10 in various fashions, including being built into the tool 10 (as shown), or attachable to the tool 10, or even merely operably associated with the tool 10. For example, the housing 26 could be placed on or otherwise associated with a work-piece (not shown), and movement of the workpiece could be used to track an equivalent movement relative to the tool 10.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tool comprising:

a housing;

a display unit attached to the housing; and a motion detection unit operably coupled to the housing and to the display unit, wherein the motion detection unit is configured to detect linear and rotational motion of the housing, to generate a first display signal indicative of the linear motion of the housing and to provide the first display signal to the display unit, and to generate a second display signal indicative of the rotational motion of the housing and to provide the second display signal to the display unit.

2. The tool as recited in claim 1, wherein the tool is a hand drill.

3. The tool as recited in claim 1, wherein the display unit includes a first display unit that comprises a depth indicator, and a second display unit that comprises a orientation indicator.

4. The tool as recited in claim 3, wherein the first display unit comprises a plurality of light-emitting diodes (LEDs) arranged in a straight line extending between a front portion of the housing and an opposite back portion of the housing.

5. The tool as recited in claim 4, wherein the LEDs are lighted in response to the first display signal to indicate movement of the housing along the line.

6. The tool as recited in claim 1, wherein the display unit includes an LCD screen.

7. The tool as recited in claim 1, wherein the motion detection unit comprises an accelerometer and a gyroscope.

8. A tool comprising:

a housing;

a display unit for indicating tool displacement and orientation;

a means for establishing a reference location of the tool; and a means to detect the displacement and orientation of the tool relative to the reference location, and to generate a signal indicative of the displacement and orientation, and to provide the signal to the display unit.

9. The tool as recited in claim 8, wherein the means for detecting the displacement and orientation relative to a reference location comprises detection of the movement of the hand tool with one or more accelerometers or gyroscopes.

10. The tool as recited in claim 8, wherein the means for establishing the reference location is a user activated button, switch, or trigger.

11. The tool as recited in claim 8, wherein the means for establishing the reference location is a switch responsive to a voice activation.

12. The tool as recited in claim 8, wherein the display signal comprises a visual signal.

13. The tool as recited in claim 8, wherein the display signal comprises a audible signal.

14. The tool as recited in claim 8, wherein one or more level indicators are attached to the tool to enable the user to better establish a level initial reference location.

15. The tool as recited in claim 8, wherein the display signal displays a numerical value for the translation of the tool.

16. The tool as recited in claim 8, wherein the user may set a predetermined desired translation and the display signal informs the user when such predetermined translation is accomplished.

17. The tool as recited in claim 8, wherein the means to detect the displacement and orientation of the tool relative to the reference location includes sensors that are adapted to receive signals from a global positioning network and use triangulation to identify the precise location and orientation of the tool.

* * * * *